United States Patent [19]

Hauenstein et al.

[11] Patent Number: 5,054,793
[45] Date of Patent: Oct. 8, 1991

[54] RESILIENT GASKET WITH SPACERS

[75] Inventors: Frederick M. Hauenstein; George C. Hedge, both of Oshkosh, Wis.

[73] Assignee: Brunswick Corporation, Skokie, Ill.

[21] Appl. No.: 255,630

[22] Filed: Oct. 11, 1988

[51] Int. Cl.⁵ .............................................. F16J 15/12
[52] U.S. Cl. ...................................... 277/1; 277/180; 277/235 B
[58] Field of Search ............... 277/235 R, 235 B, 166, 277/18 D, 1; 440/89

[56] References Cited

U.S. PATENT DOCUMENTS

| | | | |
|---|---|---|---|
| 3,191,950 | 6/1965 | Hiltner | 277/180 |
| 3,215,442 | 11/1965 | Papenguth | 277/180 |
| 3,561,793 | 2/1971 | Rode | 277/18 O X |
| 3,643,968 | 2/1972 | Horvath | 277/166 |
| 3,811,689 | 5/1974 | Farnam | 277/166 X |
| 4,204,691 | 5/1980 | Takase et al. | 277/235 B X |
| 4,535,996 | 8/1985 | Cardis et al. | 277/1 |
| 4,573,318 | 3/1986 | Entringer et al. | |
| 4,653,761 | 3/1987 | Baugh et al. | 277/235 B |
| 4,655,463 | 4/1987 | Inciong et al. | 277/180 |
| 4,762,103 | 8/1988 | Koch, Jr. | 277/235 B X |
| 4,836,158 | 6/1989 | Panzica | 277/235 B X |

OTHER PUBLICATIONS

Mercruiser 420 Engine Parts Manual, Oct. 1987, Mercury Marine Division, Brunswick Corp., pp. 16 and 17.

Primary Examiner—Allan N. Shoap
Assistant Examiner—Scott Cummings
Attorney, Agent, or Firm—Andrus, Sceales, Starke & Sawall

[57] ABSTRACT

A gasket (10) seals an interface between a pair of parts (12, 14) mounted to each other in torqued engagement and having facing surfaces (20, 22) thermally expanding towards each other upon heating, and contracting away from each other upon cooling. The gasket includes a resilient member (11) between the engaging the facing surfaces in sealing relation, and a plurality of rigid spacers (36, 38, 40, 42, 44, 46) permitting torqued engagement of the parts without squeezing out the resilient member from between the facing surfaces, and preventing compression of the resilient member beyond its permanent deformation elastic limit upon thermal expansion of the facing surfaces towards each other upon heating, including central portions (56, 58) of the facing surfaces thermally warping between spacers. Upon cooling, the facing surfaces contract away from each other, and the resilient member recovers and expands to maintain the seal against the facing surfaces.

1 Claim, 2 Drawing Sheets

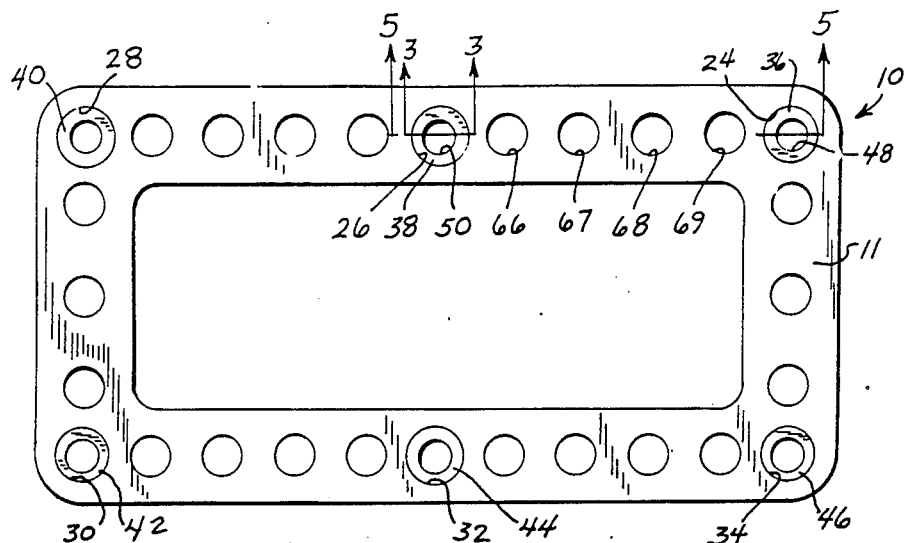
FIG. 2
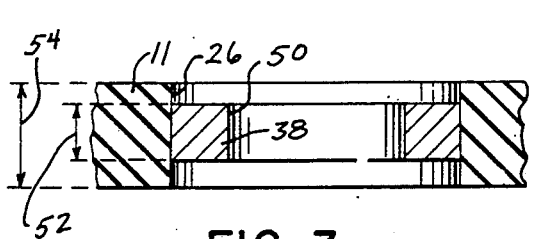
FIG. 3
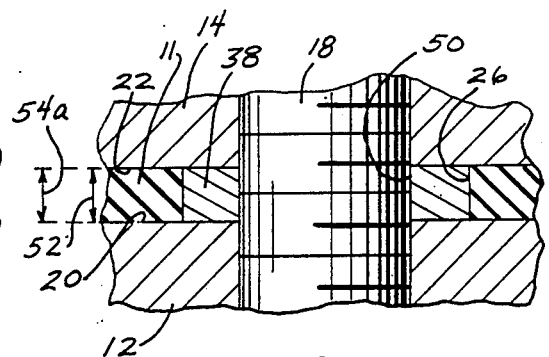
FIG. 4
FIG. 5
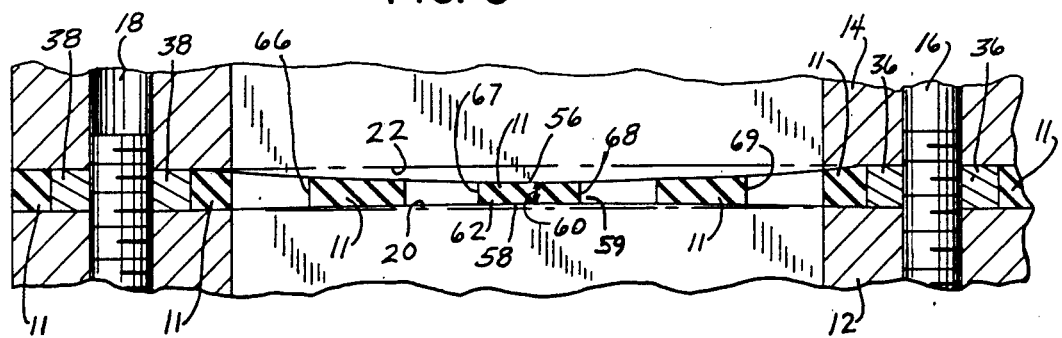

RESILIENT GASKET WITH SPACERS

BACKGROUND AND SUMMARY

The present invention arose during development efforts directed toward sealing the interface between an exhaust elbow and an exhaust manifold in a marine drive, though the invention is not limited thereto.

In a marine drive, a gasket is provided to seal the interface between an exhaust elbow and an exhaust manifold. During operation, heating of the elbow and manifold by hot exhaust gas causes thermal expansion of the facing surfaces towards each other, further compressing the gasket therebetween. Upon cooling, the facing surfaces contract away from each other, which may break the gasket seal and cause leakage.

The present invention addresses and solves the above noted problem. The invention has broad application to gaskets sealing an interface between a pair of parts mounted to each other in torqued engagement and subject to thermal expansion and contraction.

BRIEF DESCRIPTION OF THE DRAWINGS

FIG. 2 is an enlarged top plan view of the gasket of FIG. 1.

FIG. 3 is an enlarged sectional view taken along line 3—3 of FIG. 2.

FIG. 4 is a view like FIG. 3, and additionally shows a mounting bolt and an assembled condition.

FIG. 5 is a sectional view taken along line 5—5 of FIG. 2, and additionally shows mounting bolts and an assembled condition.

DETAILED DESCRIPTION

Figure 1:
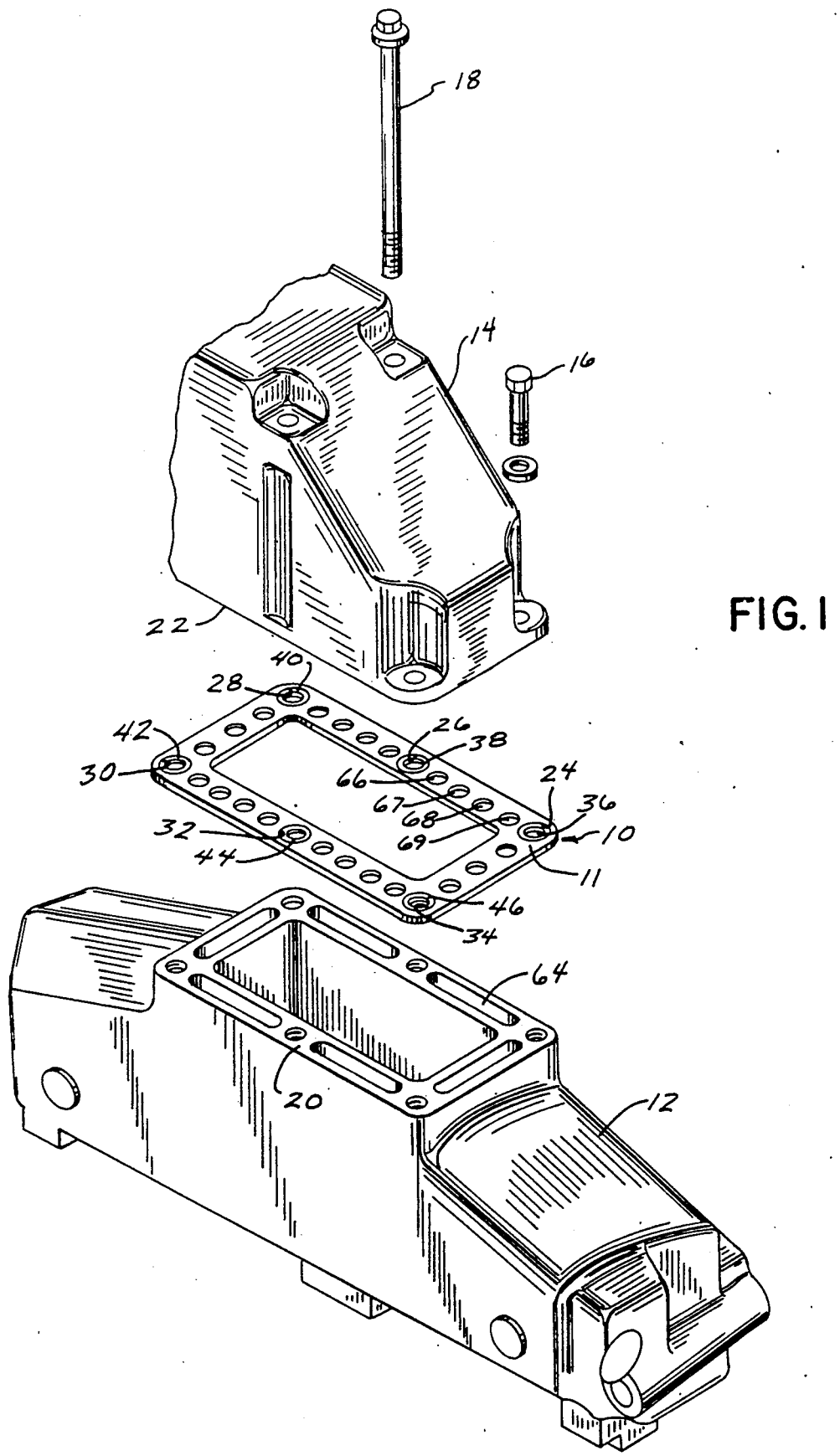
FIG. 1 is an exploded perspective view showing a gasket sealing arrangement in accordance with the invention.

FIG. 1 shows a gasket 10 sealing an interface between a pair of parts 12 and 14 mounted to each other in torqued engagement by a plurality of bolts such as 16 and 18. In the disclosed embodiment, part 12 is an exhaust manifold of a marine stern drive, and part 14 is the exhaust elbow therefore, for example as shown on pages 16 and 17 of the Mercruiser 420 Engine Parts Manual, October 1987, Mercury Marine Division, Brunswick Corp. Another example of an exhaust elbow is shown in Entringer et al U.S. Pat. No. 4,573,318, incorporated herein by reference. Parts 12 and 14 have facing surfaces 20 and 22 which thermally expand towards each other, FIG. 5, upon heating, and which contract away from each other upon cooling. Gasket 10 includes a resilient molded rubber member 11 between and engaging facing surfaces 20 and 22 in sealing relation. Member 11 has a plurality of apertures such as 24, 26, 28, 30, 32 and 34 therethrough. The gasket includes a plurality of rigid spacers 36, 38, 40, 42, 44 and 46, each received in a respective aperture. In the disclosed embodiment, the spacers are provided by brass washers. Each spacer washer has an aperture receiving a respective bolt therethrough. For example, aperture 48, FIG. 2, in spacer washer 36 receives bolt 16 therethrough, and aperture 50 in spacer washer 38 receives bolt 18 therethrough.

The spacers each have a thickness less than the thickness of resilient member 11. This is shown in FIG. 3 where the thickness 52 of spacer washer 38 is less than the thickness 54 of resilient member 11. Spacer washer 38 permits a given amount of compression of resilient member 11 to the thickness 52 upon torqued engagement of the parts, FIG. 4. As seen in FIG. 4, resilient member 11 has been compressed and has a thickness 54a equal to the thickness 52 of spacer washer 38. Spacer washer 38 provides a stop permitting torqued engagement without squeezing out resilient rubber member 11 from between facing surfaces 20 and 22 of parts 12 and 14.

Facing surfaces 20 and 22 of parts 12 and 14 have central portions 56 and 58, FIG. 5, between spacers 36 and 38 which upon heating thermally warp towards each other to a space 59 therebetween having a thickness 60 less than the thickness 52 of the spacers and further compressing a central portion 62 of resilient rubber member 11 therebetween. Manifold 12 is generally much cooler than exhaust elbow 14 because of the sea water cooling. The hotter exhaust elbow tends to warp and expand more at central portion 56 toward manifold 12, then does manifold 12 at central portion 58 expand toward exhaust elbow 14. Manifold 12 and exhaust elbow 14 have water jackets directing cooling water flow therethrough, for example as shown at jackets such as 64 in the manifold, and for example as shown in the above incorporated Entringer et al patent. Resilient member 11 has further sets of apertures, such as apertures 66, 67, 68 and 69 therethrough communicating between the water jackets in parts 12 and 14 and through which cooling water flows between such parts. The noted central portion 62 of resilient member 11 compressed between central portions 56 and 58 of facing surfaces 20 and 22 of parts 12 and 14 includes one or more apertures such as 66-69 through which cooling water flows and reduces thermal warpage of such central portions 56 and 58 of facing surfaces 20 and 22. Even with such cooling water flow, however, there is still thermal warpage of the parts, particularly facing surface 22 of the hotter exhaust elbow 14.

The spacers such as 36 and 38 have the noted thickness 52 preventing compression of resilient member 11 at central portion 62 beyond its permanent deformation elastic limit even upon the noted thermal warpage of central portions 56 and 58 of facing surfaces 20 and 22 to a reduced space 59 compressing central portion 62 of resilient member 11 to thickness 60 less than thickness 52 of the spacer washers. The thickness 52 of the spacer washers less the thermal warpage at central portions 56 and 58 still leaves a space 59 between central portions 56 and 58 of facing surfaces 20 and 22 great enough to prevent compression of resilient member 11 at central portion 62 beyond its permanent deformation elastic limit. Hence, upon contraction of facing surfaces 20 and 22 away from each other upon cooling, resilient member 11 including central portion 62 recovers and expands to maintain the seal against facing surfaces 20 and 22 including at central portions 56 and 58.

Spacer washers 36, 38, 40, 42, 44 and 46 are held and retained by resilient member 11 by a light friction fit in respective apertures 24, 26, 28, 30, 32 and 34. This facilitates ease of installation.

It is recognized that various equivalents, alternatives and modifications are possible with the scope of the appended claims. For example, resilient rubber member 11 may be molded to the brass spacer washers to provide a unitary assembly. The spacer washers are placed in the mold prior to the molding operation, and the molding operation is then performed with the spacer washers in place such that rubber member 11 is molded to the washers.

In another alternative, the spacer washers are integrally formed as small bosses or projections on one or both of parts 12 and 14 at respective facing surfaces 20 and 22. For example, facing surface 20 of part 12 may have integrally formed bosses thereon projecting slightly upwardly therefrom. The upstanding integral bosses have an annular configuration and receive the respective mounting bolts such as 16 and 18 therein and also provide the noted spacing function. Resilient member 11 is received on facing surface 20, with the respective upstanding integral bosses extending upwardly through respective apertures 24, 26, 28, 30, 32 and 34 in resilient member 11. Such integral bosses engage the underside facing surface 22 of part 14 and perform the same function as spacer washers 36, 38, 40, 42, 44 and 46. Such integral spacer bosses or washers may also be formed on the facing surface 22 of part 14, or each of the facing surfaces 20 and 22 of respective parts 12 and 14 may have bosses extending toward and engaging each other to provide the noted spacing function permitting torqued engagement of the parts without squeezing out resilient member 11 from between facing surfaces 20 and 22, and preventing compression of resilient member 11 beyond its permanent deformation elastic limit upon thermal expansion of facing surfaces 20 and 22 towards each other upon heating, such that upon contraction of facing surfaces 20 and 22 away from each other upon cooling, resilient member 11 recovers and expands to maintain the seal against facing surfaces 20 and 22.

We claim:

1. A method for sealing an interface between a pair of parts mounted to each other in torqued engagement by a plurality of bolts, said parts having facing surfaces thermally expanding towards each other upon heating, and contracting away from each other upon cooling, comprising providing a gasket comprising a resilient member between and engaging said facing surfaces in sealing relation, providing a plurality of apertures through said resilient member, providing a plurality of rigid spacers each received in a respective said aperture, providing each spacer with an aperture receiving a respective said bolt therethrough, providing said spacers with a thickness less than the thickness of said resilient member and permitting a given amount of compression of said resilient member upon torqued engagement of said parts and permitting such torqued engagement without squeezing out said resilient member from between said facing surfaces, providing said facing surfaces with central portions between said spacers thermally warping upon heating towards each other to a space therebetween less than the thickness of said spacers and further compressing a central portion of said resilient member therebetween, providing said spacers with said thickness preventing compression of said resilient member at said central portion beyond its permanent deformation elastic limit even upon said thermal warpage of said central portions of said facing surfaces between said spacers, determining said thickness of said spacers such that said thickness of said spacers less said thermal warpage at said central portions still leaves a space between said central portions of said facing surfaces great enough to prevent compression of said resilient member at said central portion beyond its permanent deformation elastic limit, such that upon contraction of said facing surfaces away from each other upon cooling, said resilient member recovers and expands to maintain the seal against said facing surfaces including at said central portions.

* * * * *